United States Patent [19]
Barker et al.

[11] Patent Number: 4,736,379
[45] Date of Patent: Apr. 5, 1988

[54] CONDUCTION COOLED ION LASER

[75] Inventors: Gerald C. Barker, Palo Alto; Jeffrey L. Cannon, San Jose; Richard D. Cullins, Cupertino, all of Calif.

[73] Assignee: Coherent, Inc., Palo Alto, Calif.

[21] Appl. No.: 806,040

[22] Filed: Dec. 6, 1985

[51] Int. Cl.$^4$ .............................................. H01S 3/04
[52] U.S. Cl. ........................................ 372/34; 372/61; 372/58
[58] Field of Search ................... 372/62, 61, 63, 87, 372/67, 58, 34

[56] References Cited

U.S. PATENT DOCUMENTS

| | | | |
|---|---|---|---|
| 3,522,551 | 8/1970 | Fendley, Jr. | 372/62 |
| 3,624,543 | 11/1971 | Rockwell, Jr. | 372/62 |
| 4,378,600 | 3/1983 | Hobart | 372/62 |
| 4,553,241 | 11/1985 | Chaffee | 372/62 |

Primary Examiner—Leon Scott, Jr.
Attorney, Agent, or Firm—Limbach, Limbach & Sutton

[57] ABSTRACT

The subject invention relates to a conduction cooled ion laser capable of producing higher output power. The device includes an insulated tube and a plurality of heat conducting members mounted in thermal contact with the wall of the tube. Primary and secondary ring gas barriers or shields project axially from the heat conducting members with the primary shield being located radially inward with respect to the secondary shield. The shields are mounted such that they axially overlap to define a reentrant configuration. The reentrant configuration allows for the operation of the laser at a higher power with the same voltage safety margin above the instability voltage.

6 Claims, 3 Drawing Sheets

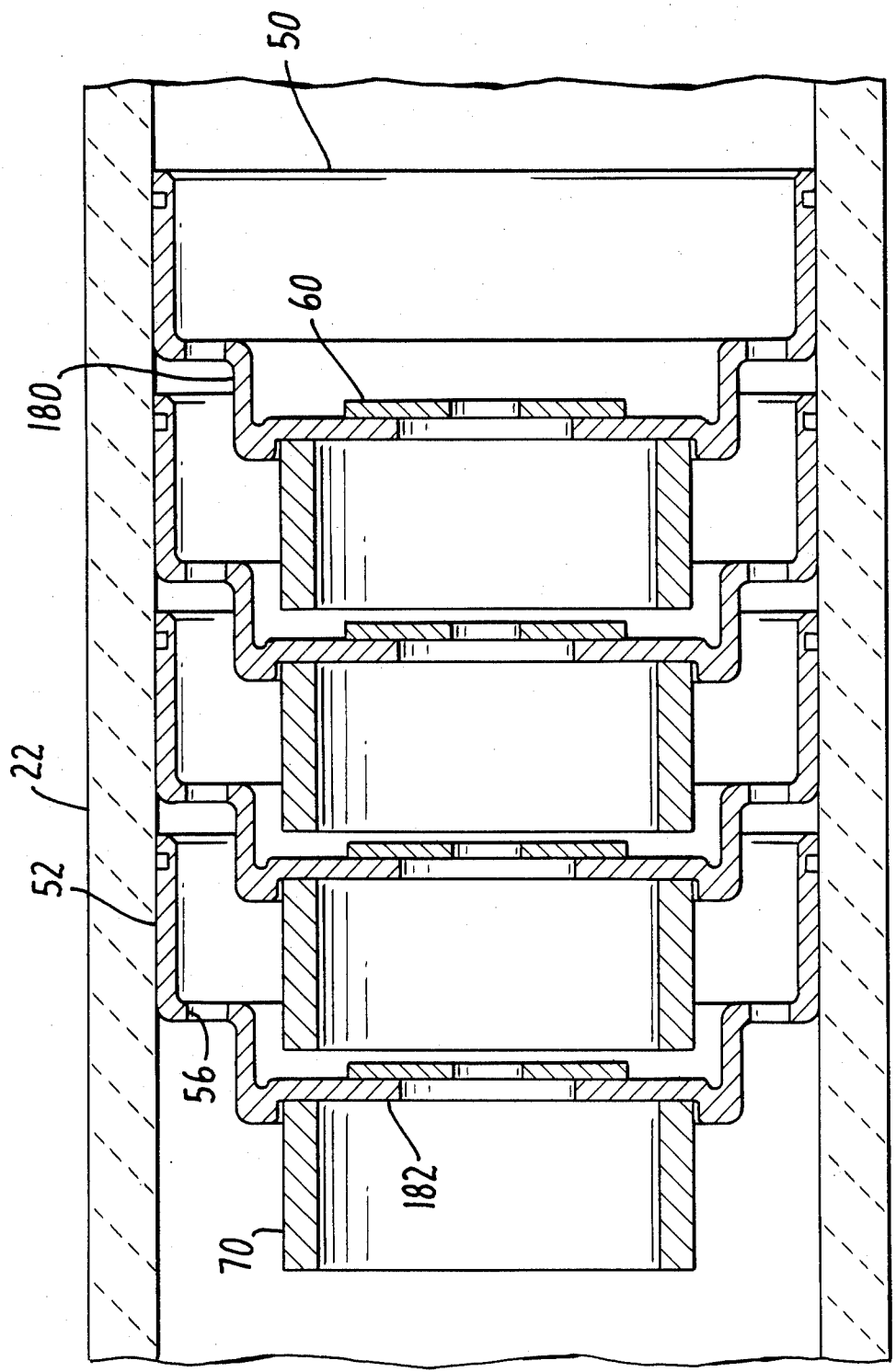

CONDUCTION COOLED ION LASER

TECHNICAL FIELD

The subject invention relates to a new and improved conduction cooled gaseous ion laser. The active bore region of the laser is provided with a reentrant gas shield configuration for reducing discharge instabilities and permitting the generation of higher output powers.

BACKGROUND OF THE INVENTION

The subject invention is related to improvements in gaseous ion lasers. It is particularly suited for use in a conduction cooled ion laser of the type disclosed in U.S. Pat. Nos. 4,378,600 issued Mar. 29, 1983 to Hobart and 4,376,328 issued Mar. 15, 1983 to Mefferd, both assigned to the same assignee as the subject invention and incorporated herein by reference.

The type of gaseous ion laser disclosed in the latter patents includes a relatively thin-walled, electrically insulating outer envelope, formed from a ceramic material, such as an alumina tube. A plurality of thin-walled heat conducting members are mounted in spaced-apart relation along the length of the envelope or tube and placed in thermal contact therewith. In the latter patents, the heat conducting members are permanently affixed to the inner wall of the tube. Each of the heat conducting members in the above cited patents include a central aperture surrounded by a sputter-resistant material, for extending the life of the tube. All the apertures are aligned in assembly to define a straight discharge path. The tube is also provided with electrodes for exciting the gas within the tube and an optical cavity aligned along the discharge path.

In one aspect of the invention disclosed in the Hobart patent, gas pressure imbalances can be controlled through the use of cylindrical ring gas barriers, coaxially mounted within the tube, to separate the central discharge from an internal gas return path. In the latter patent, the internal gas return path is defined by a plurality of apertures formed in the outer periphery of the heat conducting members. It had been found that without the cylindrical ring gas barriers, the internal gas return path was insufficient to prevent the pressure differential built up by gas pumping in the discharge from significantly lowering output power of the laser or extinguishing the discharge. In such a case, it may be necessary to provide an external gas bypass, such as a tube outside of the insulating envelope and connected between the anode and cathode of the laser, to reduce this pressure differential. With the addition of the cylindrical ring gas barrier, an internal bypass alone is sufficient to compensate for gas pumping and an external gas bypass can be eliminated.

The device disclosed in the Hobart and Mefferd patents has been successfully manufactured for a considerable time. Argon ion lasers having a discharge tube approximately two feet in length are capable of generating 5 watts of continuous output power in the visible spectrum over the warranted lifetime of the product. An output in the ultraviolet spectrum on the order of 200 milliwatts can also be generated. These outputs are achieved when the laser is operated at 40 amperes of current.

As can be appreciated, it is always desirable to produce higher output powers for a given envelope size. It is known that more output power can be produced if the operating current is increased, or the pressure is decreased. Unfortunately, the discharge in the tube tends to become unstable when either the current is increased or the pressure is decreased beyond set levels. By instability it is meant that ionization waves in the discharge grow to large amplitudes (i.e., there are radio-frequency current oscillations on top of the direct current discharge), which if left unchecked, can lead to catastrophic results. These high-frequency current oscillations need not terminate on the normal electrodes, but can extend into parts of the tube that are not directly cooled, and thus possibly crack the ceramic envelope or damage other laser components.

Accordingly, it is an object of the subject invention to provide a new and improved gaseous ion laser which includes an improved gas barrier configuration for enhancing power output.

It is another object of the subject invention to provide a new and improved gaseous ion laser which uses a reentrant gas barrier design for enhanced operation.

It is a further object of the subject invention to provide a reentrant shield configuration which is easy to accurately manufacture and enhances the separation between hot, on-axis ions and the cool return flow of atoms.

SUMMARY OF THE INVENTION

In accordance with these and other objects, the subject invention provides a new and improved ion laser capable of generating higher output powers. The gaseous ion lasers are of the type having a thin-walled cylindrical tube formed from an electrically insulating material. A plurality of thin-walled heat conducting members are provided and mounted in spaced-apart relationship along the length of the tube. The majority of the heat conducting members in the middle of the tube carry small-bore, aligned, sputter-resistant apertures that define the active bore region. The lasing power generated per unit volume of discharge in an ion laser is a strong function of the current density (the visible output power increasing roughly as the square of the current density). The small-bore region, where the current density is maximum, generates virtually all of the laser power and is termed the active bore region. The active bore region can be contrasted with the heat conducting members located at the opposed ends of the tube which define the cathode and anode transition regions discussed and illustrated in the body of the specification.

Each of the heat conducting members are thermally attached with the outer thin-walled tube. Each heat conducting member includes a central aperture. These central apertures are coaxially aligned to define a central discharge path or bore. In the preferred embodiment, thin tungsten discs having coaxially aligned apertures are mounted on each of the heat conducting members to define a sputter-resistant bore. Each of the heat conducting members is also provided with a plurality of gas return holes located at the outer periphery thereof.

The laser is provided with an anode and a cathode and can be supplied with a current to excite the gas within the tube. An optical cavity is aligned around the tube to provide the optical feedback to generate laser light.

As set forth in the above cited patent to Hobart, a plurality of primary cylindrical ring gas barriers are affixed to the heat conducting members located in the active bore region of the tube. In accordance with the subject invention a means is provided for increasing the output power by permitting an increase in the operable current without causing instabilities. This means is defined by a plurality of secondary cylindrical ring gas barriers which are affixed to the other side of the heat conducting members. The secondary cylindrical ring gas barriers are mounted at a location radially outward with respect to the primary cylindrical ring gas barriers and radially inward with respect to the gas return holes of the heat conducting member. The primary and secondary ring gas barriers are arranged such that they axially overlap.

This axial overlap or reentrant design functions to shift the instability point of the tube, allowing it to be operated at a higher current at a given pressure. While the operating pressure and pressure differential in the active bore region are of primary interest in determining gas pumping and the instability point, it is difficult to make accurate measurements using pressure gauges because of end effects at the electrodes. In practice it is more convenient and meaningful to use tube voltage as a measure of the average pressure along the bore for instability performance.

The instability point can then be more conveniently defined by operating the tube at a fixed current and reducing the gas fill pressure of the tube by pumping some of the gas into a vacuum station manifold and observing the tube voltage when discharge oscillations first occur. This voltage is termed the instability voltage. The addition of the secondary ring gas barrier to a 5 watt argon laser reduced the observed instability voltage about five percent as discussed below.

In an ion laser, fill gas is consumed due to sputtering in the bore and the tube voltage slowly decreases towards the instability point during operation. In commercial practice, protective circuitry is used which either operates a gas refill system to raise the pressure or shuts off the laser preventing destructive discharge oscillations. A voltage safety margin above the instability voltage is required for safe operation of the protective circuitry. Thus, the reduction of the instability voltage produced by the reentrant shield design allows the laser to be operated at higher current while maintaining the same voltage safety margin above the instability voltage.

It is believed that the primary shield alone functions to reduce the number of ions which migrate to the peripheral gas return region defined by the gas return holes in the heat conducting members. The primary shield acts as a baffle and increases the likelihood of the recombination of ions to the neutral state through collisions with the cold walls of the barrier. It is believed that the ability of the primary shield to perform these functions is related to the precision which is achieved in defining the spacing between the free end of the shield and the adjacent cup. It is desirable that this spacing be comparable to or less than the mean free path of an ion. While the mean free path will vary with gas pressure and temperature gradients inside the tube and is also dependent upon the geometry and operating conditions of the tube, a practical and effective spacing can be determined.

In the manufacture of the tube, it has been difficult to insure that the spacing between the end of the primary shield and the adjacent heat conducting member is maintained within the desired tolerance. This spacing is defined in the assembly of the tube by the translation distance between insertion of successive heat conducting members as described in U.S. Pat. No. 4,376,328. In this regard, it is believed that the secondary shield of the subject invention cooperates with the primary shield to limit the number of ions migrating into the gas return region. More particularly, because the radial spacing between the coaxial shields is determined by the part dimensions and not by a translation step (as in the prior art), this spacing can be more readily controlled, and the manufacturing tolerances on the axial spacing between the primary shield and the adjacent heat conducting member can be relaxed.

Further objects and advantages of the subject invention will become apparent from the following detailed description taken in conjunction with the drawings in which:

BRIEF DESCRIPTION OF THE DRAWINGS

FIG. 4 is a cross-sectional view, similar to FIG. 2, illustrating an alternate embodiment of the subject invention.

DESCRIPTION OF THE PREFERRED EMBODIMENTS

Figure 1:
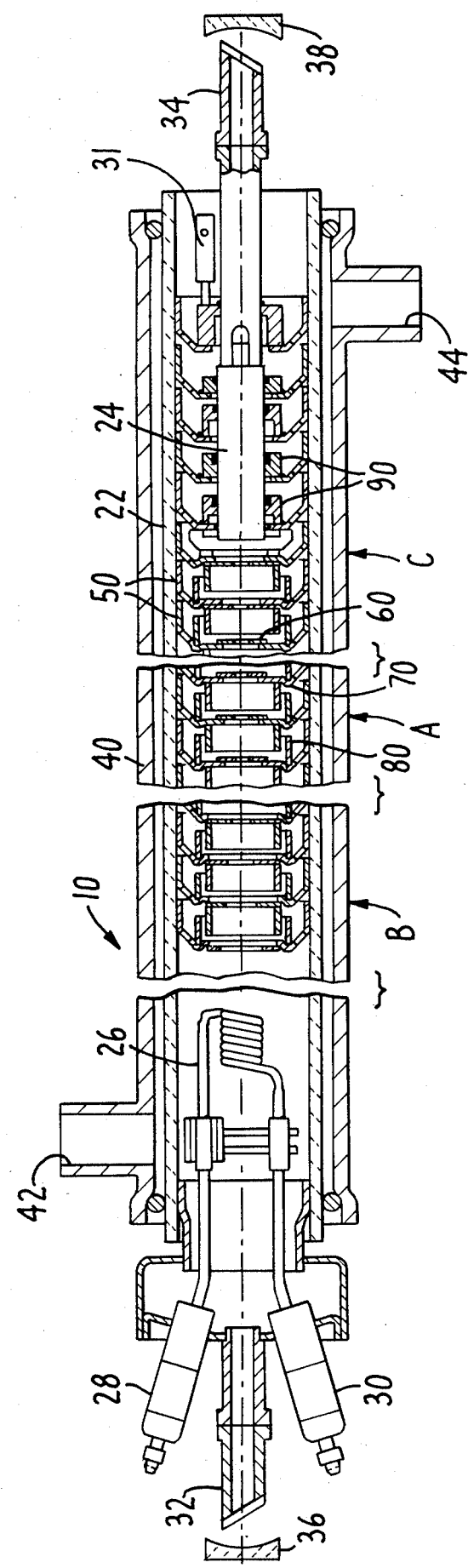
FIG. 1 is a cross-sectional view of the new and improved ion laser of the subject invention.

Referring to FIG. 1, there is illustrated a cross-sectional view of a conduction cooled ion laser 10 incorporating the improvement of the subject invention. The improvement is particularly suited for a laser of the type disclosed in U.S. Pat. Nos. 4,378,600 and 4,376,328, cited above. This type of conduction cooled ion laser includes a relatively thin-walled ceramic envelope 22, which may be formed from alumina. The tube is vacuum sealed and can be with a noble gas such as argon or krypton. The opposed ends of the tube are provided with an anode structure 24 and a cathode structure 26. A pair of electrical connectors 28 and 30 are provided to facilitate connection of the cathode to a power supply. The electrical connection to the anode is made at the pin 31. When connected to a power supply, the anode and cathode provide a means for exciting the gas held within the tube.

The optics of the laser include a pair of opposed window assemblies 32 and 34 and a pair of opposed mirrors 36 and 38. Mirrors 36 and 38 function to define an optical cavity which surrounds the tube for reflecting the laser light.

In operation of the laser, significant heat is generated which must be removed from the envelope. This heat may be dissipated through air cooling. However, in the preferred embodiment, a water jacket 40 is provided for cooling the envelope. Jacket 40 has an inlet 42 and an outlet 44. Water flowing in the jacket absorbs heat conducted out of the tube to minimize operating temperatures.

Figure 2:
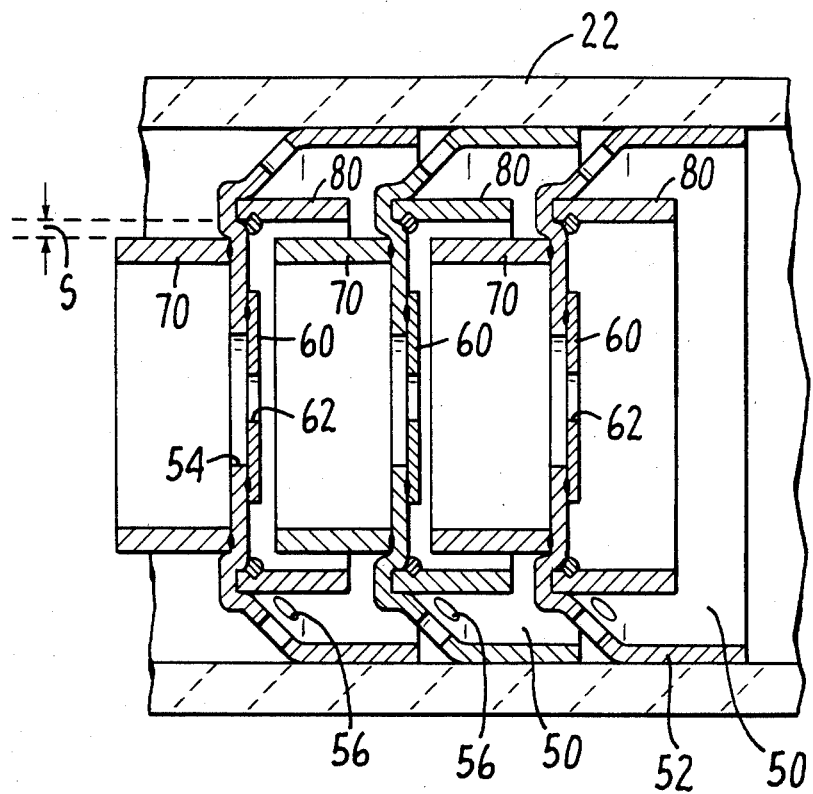
FIG. 2 is an enlarged, cross-sectional view of a portion the active bore region of the laser of the subject invention.

As shown in FIG. 2, in the central portion of the tube a means is provided for confining the gaseous discharge and for conducting heat away from the central bore to the outer surface of the tube. The means for conducting heat is defined by a plurality of heat conducting members 50 which are generally cup-shaped in configuration. Members 50 may be formed from copper since it is highly heat conductive, relatively malleable and may be readily brazed. It is important that a thermally conductive path be defined between the heat conducting member and the outer envelope. Here that path is established through brazing. Each member 50 is provided with a rim section 52, which is brazed to the inner surface of the ceramic tube 22. Brazing can be accomplished through a variety of well-known methods, including active braze techniques and premetallizing techniques.

Other structures may be utilized which do not have a continuous outer envelope, such as that described in U.S. Pat. No. 3,531,734, issued Sept. 29, 1970, to Gordon. However, it has been recognized that the latter structure requires multiple seals and may not be as commercially feasible as the illustrated embodiment.

Each heat conducting member 50 is provided with a central aperture 54. Members 50 are mounted in a manner such that the apertures 54 are generally aligned. Heat conducting members 50 are further provided with a plurality of gas return holes 56 located adjacent the periphery of the tube. The gas return holes allow for recirculation of gases during operation of the laser as discussed more fully below.

In the illustrated embodiment, the laser discharge is confined along the central axis of the tube by a plurality of thin tungsten discs or washers 60 brazed to the face of each cup 50 for good thermal conductivity. The tungsten discs have apertures 62 designed for confining the discharge. The tungsten material is relatively sputter-resistant and this increases the lifetime of the tube.

As set forth in the above cited patent to Hobart, a cylindrical ring gas barrier 70 may be provided for reducing end-to-end pressure differentials which can develop in a tube of this nature. More specifically, in operation, gas is pumped by the high current density discharge towards one end or the other of the tube. This pumping, unless balanced by an effective gas return path, results in pressure imbalances which adversely affect the performance of the tube. It had been found that the placement of the ring gas barrier 70 or ion shield in the tube would result in a more effective gas return action through the peripheral holes 56 and a decrease in pressure differentials. It is believed that this ring gas barrier provides a means for isolating the gas return region defined by the holes 56 in the heat conducting members from the hot, on-axis discharge. In addition, the cylindrical ring gas barrier is thermally connected to the cool heat conducting members and provides a surface to permit the ions to recombine and the hot gas to cool before entering the gas return region. The use of cylindrical ring gas barriers in a laser proved to be successful both experimentally and from a commercial standpoint as long as the spacing between the shields and the adjacent heat conducting members is kept small.

Recently, efforts have been made to increase the power output from this type of laser. As noted earlier, in order to increase the power output of a laser, it is desirable to increase the current in the tube or reduce the gas pressure. However, running the current up and reducing the operating pressure will at some point produce instabilities in the discharge, causing the plasma to oscillate. Oscillations in the discharge will reduce laser output power and severe oscillations can actually rupture the tube. The subject invention provides a means for reducing the instability voltage (as defined above) thereby allowing the tube to be operated at higher current, to produce higher output power, without becoming unstable.

The improvement which allows the power to be increased is shown in more detail in FIG. 2. As illustrated therein, the improvement includes providing a secondary ring gas barrier 80 which is also mounted coaxially in the tube but at a point radially outward of the primary ring gas barrier 70. The secondary ring gas barrier or shield 80 is connected to the surface of the heat conducting member opposed to the surface on which the primary ring gas barrier 70 is connected. As seen clearly in FIG. 2, the primary ring gas barrier thus fits radially inside the secondary ring gas barrier. The axial dimensions of the shields are designed such that they axially overlap to define a reentrant configuration.

In the preferred embodiment, it is desirable to fix the radial separation s between the primary and secondary shields to be comparable to or less than the mean free path of an ion. The absolute radial spacing in any given laser design will, of course, be dependent on factors which determine this mean free path length, such as operating temperature, pressure conditions and shapes of the passageways in the internal parts. In an optimized ion laser the mean free path in the active bore region will be comparable to the bore diameter in this region. It is intended that the radial spacing s be small enough such that it would be highly unlikely for an ion to pass from the discharge region through to the gas return region without colliding with one of the cold walls of the gas barrier. Such a collision will cause the ion to recombine and form the original gas atom. Cool, uncharged atoms will become part of the internal gas return flow, whereas the presence of hot ions can actually impede this flow. The reentrant configuration, while limiting the migration of hot ions into the gas return area, nevertheless allows the passage of neutral atoms. Thus, the local connection between the central discharge region and the surrounding gas return region, is maintained.

Experimental data taken with the reentrant configuration of the subject invention show that the power output has been improved while maintaining a stable discharge. Initial tests with the prior art laser included increasing the current to 45 Amps in order to increase output power. These attempts caused the tubes to oscillate and become unstable unless the tube voltage was increased by adding more gas.

Bore erosion was also a concern in the early tests since bore life is dependent on current density. To maintain roughly the same bore life as in the existing lasers, the bore diameter of new experimental tubes was increased by 4.5 percent thereby maintaining approximately the same current density as compared to the single shield tubes of the prior art.

Two prototype laser tubes were built with the only difference being that the second tube had a reentrant ion shield configuration. In a direct comparison, the instability voltage at a fixed current for the reentrant shield tube was reduced by approximately 5 percent over the single shield tube. This reduction in instability voltage allowed the tube to be run at a lower voltage while maintaining the same voltage safety margin and produces higher output power in the visible and ultraviolet spectrum.

The end to end pressure differential in the experimental tube having the reentrant design was measured. Without correcting for end effects, an apparent increase in the pressure differential over the single shield tube was observed. To reduce this pressure differential, a third prototype tube was built wherein the area of the bypass holes 56 in the heat conducting members was increased by 16 percent. The increased conductance provided by the enlarged bypass holes reduced the pressure differential by approximately 25 percent while further reducing the instability voltage by an additional two percent. Since the new tubes can be operated stably at a higher input power a proportional increase in output power can be produced.

In order to appreciate the enhancement provided by the subject invention an INNOVA 90 five watt argon ion laser, constructed in accordance with the prior art single shield configuration, was compared against a laser of similar overall dimensions having the reentrant shield design. Both lasers were operated at 45 Amps. Due to the enlarged bore diameter of the new tube, the current density was eight percent less than the prior art tube. Furthermore, the new tube was operated at six percent less input power. Nonetheless, the new tube with the reentrant shield design generated output powers in the visible lines (TEM$_{00}$ mode) that were on average 28 percent higher than in the single shield tube and 18 percent higher for multiline ultraviolet (TEM$_{00}$ mode)

Assembly of the subject invention can be performed in a manner quite similar to that disclosed in the Mefferd patent. For example, individual heat conducting members can be loaded into the tube and expanded into mechanical contact with the wall. The mechanical contact is intended to hold the cup in place during the brazing step. An alternative method is to loosely stack the heat conducting members in the tube, separated by insulating ceramic spacers, and allow the heating of the braze step to thermally expand the cups into contact with the wall. The cups can be mounted with a braze ring (not shown) about the circumference of the rim 52. The braze ring may be formed from an active braze material, such as Ticusil. Brazing with Ticusil is performed under vacuum conditions and at a temperature between 830° and 850° C. Further information about brazing conditions can be obtained from WESGO, the manufacturer of Ticusil.

Prior to inserting the cups into the ceramic envelope, it is desirable to prebraze the primary cylindrical ring gas barrier 70 to the heat conducting member 50. Since this braze will be heated again when the other parts are brazed, a braze alloy should be used which will not remelt when the main tube parts are brazed. Nicusil-3 satisfies this criteria because after it is initially brazed, it becomes copper rich and the remelt temperature increases.

Figure 3:
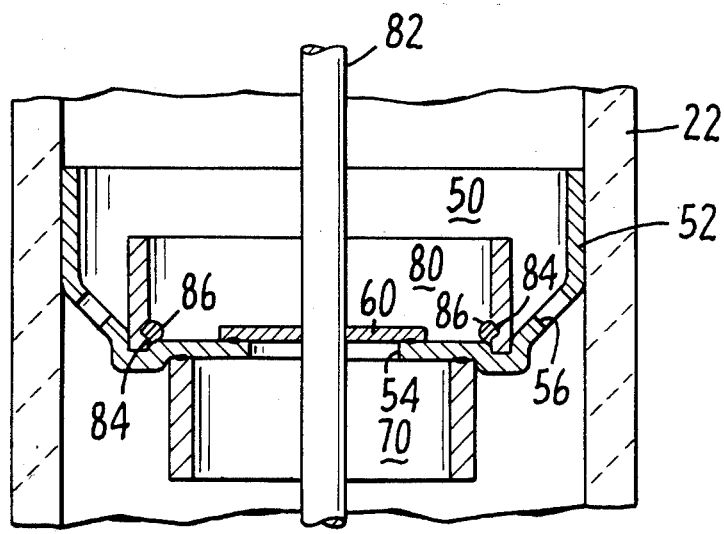
FIG. 3 is a partial cross-sectional view illustrating one of the steps in assembling the laser of the subject invention.

The tube is held in a fixture, in a horizontal position, and a wire mandrel 82 is passed through the tube. The wire mandrel may be formed from tungsten. The heat conducting members are then individually loaded and expanded in place. A secondary ring gas barrier 80 and a tungsten disc 60 can be mounted loosely about the mandrel 82, between each heat conducting member 50, as shown in FIG. 3. After the loading all the elements in the laser, the tube is raised from the horizontal position shown in FIG. 1 to a vertical position, as shown in FIG. 3. At this stage, the tungsten discs and secondary ring gas barrier 80 will drop down into contact with the heat conducting member 50. The mandrel 82 is drawn taut during the brazing step in order to coaxially align all the tungsten discs in the active bore region. This step is necessary to ensure proper optical, straight-line, alignment of the bore defining elements to permit lasing. All of the latter steps are described in greater detail in the Mefferd patent.

With respect to the specific assembly of the subject invention, cylindrical ring gas barrier 80 is preferably provided with a circumferential groove 84. Groove 84 is designed to capture a braze ring 86 that may be formed from Nicusil-3. To facilitate alignment of the secondary shield 80, the heat conducting members 50 can be provided with a circumferential recess 88 for receiving the end of the shield 80. It should be apparent that this assembly approach allows the radial spacing between the reentrant rings to be accurately controlled to insure that the desired separation between the hot ions of the discharge and the cool gas return is maintained.

The assembly as shown in FIG. 3 is then placed in an furnace and taken through a braze cycle which results in the bonding of the tungsten disc 60 and the secondary ring 80 to the heat conducting member 50 and the heat conducting member to the envelope 22. Suitable time, temperature and gas conditions for the furnace can generally be obtained from the braze material manufacturer.

A commercial device has been manufactured in accordance with the subject invention. More detailed information concerning the actual parts utilized in this device is given below. It should be noted that FIG. 1 is drawn to show only a fraction of the total length of the tube and is not intended to be a manufacturing drawing.

In the commercial embodiment, there are a total of 49 heat conducting members carrying the tungsten discs 60. Of these 49 members, 41 are configured in accordance with the structure shown in FIG. 2, (and segment A in FIG. 1) and define the active bore region in the central section of the tube. Near the cathode end of the tube there are six heat conducting members which define the cathode transition region (segment B in FIG. 1). In this region, the bore diameters of the tungsten discs increase (see Table 2) such that current density of the discharge makes the transition from a high density arc to a low density glow. At the opposed end of the tube there are two heat conducting members 50 which define the anode transition region (segment C in FIG. 1). The bore diameters in this section also increase. The anode itself is mounted with heat conducting members that include elements 90 of varying thermal conductivity to uniformly distribute the heat load. It should be understood that the subject invention is directed towards a reentrant design that is utilized in the active bore region (segment A) where laser gain and gas pumping occur.

Table I below provides dimensions of the parts in the active bore region as illustrated in FIG. 2. Table II provides additional information about the bore diameters of the tungsten inserts 60 throughout the length of the laser. The laser described below is marketed under the trade designation INNOVA 90-6.

TABLE 1

Main Bore Nominal Part Dimensions*
Model I90-6

| | | inches |
|---|---|---|
| Heat Conducting Member 50 | thickness | 0.045 |
| | O.D. | 1.19 |
| | dia. of opening 54 | 0.31 |
| | number of gas return holes | 18 |
| | dia. of gas return holes (before | 0.10 |

TABLE 1-continued

Main Bore Nominal Part Dimensions*
Model I90-6

|  |  | inches |
|---|---|---|
|  | forming) dia. of circle through centers of gas return holes | 1.06 |
| Discs 60 | thickness | 0.020 |
|  | Axial spacing to next disc | 0.39 |
|  | diameter of central hole 62 | see Table 2 |
| Primary Shield 70 | I.D. | 0.63 |
|  | O.D. | 0.75 |
|  | Axial Length | 0.30 |
| Secondary Shield 80 | I.D. | 0.85 |
|  | O.D. | 0.9 |
|  | Axial Length | 0.2 |
| Mean Radial Spacing Between Shields 70, 80 | "s" | 0.05 |

*The tolerance on dimensions given to thousandths of the inch is ±.005 inches and hundredths is ±.01 inches.

TABLE 2

Nominal Bore Diameters 62 of Tungsten Discs 60 In the Model INNOVA 90-6 Laser

| Quantity | Diameter (inches) |  |
|---|---|---|
| each | .270 | CATHODE |
|  | .220 | TRANSITION |
|  | .172 | REGION |
|  | .144 | (Prebrazed) |
|  | .128 |  |
|  | .120 |  |
|  | .115* |  |
| 39 each | .115 | MAIN BORE |
| 1 each | .115* | ANODE |
|  | .172 | TRANSITION |
|  | .220 | REGION |
|  |  | (Prebrazed) |

*These two discs establish the bore centerline and are considered active bore elements.

The inserts of the transition regions which have larger bore diameters than the mandrel diameter cannot be centered by the mandrel in the assembly operation described above. Thus, these bore assemblies are prebrazed on the centers of their respective heat conducting members with Nicusil-3. These prebraze assemblies are then assembled into the ceramic tube in a normal fashion and follow the axial contour of the ceramic.

Referring to FIG. 4, there is illustrated an alternate embodiment for constructing a laser in accordance with the subject invention, where like numbers are used to represent like parts. The primary difference between this embodiment and the first embodiment is that the secondary ring gas barrier 180 is formed integrally with the heat conducting member 50. As can be seen from the figure, heat conducting member 50 has rim section 52 connected to the inner surface of the ceramic tube 22. The second section of member 50 projects radially inwardly from the wall and carries gas return holes 56. A third section of member 50 extends axially along the length of the tube to define the secondary shield 180. A planar portion 182 of member 50 extends radially inwardly providing a surface to mount both the primary ring gas barrier 70 and the tungsten bore defining disc 60. As with the first embodiment, secondary shield 180 axially overlaps primary shield 70 to define the reentrant configuration.

In summary. there has been provided a new and improved conduction cooled ion laser capable of attaining higher output powers. The device makes use of a reentrant gas shield configuration in the active bore region to reduce the instability voltage and permit the laser to operate in a stable condition at higher output power.

While the subject invention has been described with reference to the preferred embodiments, it is to be understood that various other changes and modifications could be made therein, by one skilled in the art, without varying from the scope and spirit of the subject invention as defined by the appended claims.

We claim:

1. In a conduction cooled ion laser comprising:

a elongated gas confining tube made of an electrically-insulated material, said tube having opposed ends and an intermediate region;

a plurality of thin-walled heat conducting members mounted in spaced-apart relation along the length of the tube, with the heating conducting members in said intermediate portion of the tube defining an active bore region, and with the outer periphery of each heat conducting member being in thermal contact with said tube, each heat conducting member having a central aperture said apertures being coaxially aligned to define a central discharge path and with each heat conducting member further including at least one gas return hole located adjacent the inner wall of the tube;

means to excite a gas discharge within the tube;

an optical cavity aligned around said tube;

a plurality of axially projecting primary ring gas barriers associated with at least some of the heat conducting members located in the active bore region of the tube; the improvement comprising and a plurality of axially projecting secondary ring gas barriers associated with at least some of the heat conducting members located in the active bore region of the tube, with the secondary ring gas barriers being located radially outward with respect to the primary ring gas barriers and radially inward with respect to the gas return holes of the heat conducting members and with the ring gas barriers being arranged such that the primary and secondary ring gas barriers of adjacent heat conducting members axially overlap to influence migration of ions from the central discharge path to the gas return holes in the heat conducting members thereby improving performance.

2. A laser as recited in claim 1 wherein said heat conducting members are permanently secured to the inner surface of said tube.

3. A laser as recited in claim 1 further including a plurality of thin tungsten discs affixed to individual ones of said heat conducting members, with each tungsten disc having a central aperture therein, with the apertures in the discs being coaxially aligned to define a sputter-resistant bore.

4. A laser as recited in claim 1 wherein the radial spacing between the primary and secondary ring gas barriers is comparable to or less than a mean free path of an ion.

5. A laser as recited in claim 1 wherein the radial spacing between the primary and secondary ring gas barriers is comparable to or less than the diameter of the bore in the active region.

6. A laser as recited in claim 1 wherein said secondary ring gas barriers are formed integrally with the associated heat conducting members.

* * * * *

UNITED STATES PATENT AND TRADEMARK OFFICE
CERTIFICATE OF CORRECTION

PATENT NO. : 4,736,379

DATED : April 5, 1988

INVENTOR(S): Gerald C. Barker, Jeffrey L. Cannon, Richard D. Cullins

It is certified that error appears in the above - identified patent and that said Letters Patent is hereby corrected as shown below:

<u>In the Specification</u>

Column 4, line 40, should read "can be --filled--".

Column 7, line 60, omit "the" before "loading".

Column 8, line 17, "an" should be --a--.

<u>In the Claims</u>

Claim 1, column 10, line 18, "heating" should be --heat--.

Claim 1, column 10, line 33, omit "and"; add a colon after comprising.

Signed and Sealed this

Twenty-fifth Day of October, 1988

Attest:

DONALD J. QUIGG

*Attesting Officer*   *Commissioner of Patents and Trademarks*